US006961484B2

(12) United States Patent
Johnson et al.

(10) Patent No.: US 6,961,484 B2
(45) Date of Patent: Nov. 1, 2005

(54) APPARATUS AND METHODS FOR STABILIZATION AND CONTROL OF FIBER DEVICES AND FIBER DEVICES INCLUDING THE SAME

(75) Inventors: Alan E. Johnson, San Jose, CA (US); Anders Grunnet-Jepsen, San Jose, CA (US); Tsung-Ein Tsai, San Jose, CA (US); John N. Sweetser, San Jose, CA (US); Matthew Miller, Grass Valley, CA (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 10/153,452

(22) Filed: May 21, 2002

(65) Prior Publication Data

US 2002/0176088 A1 Nov. 28, 2002

Related U.S. Application Data

(60) Provisional application No. 60/293,681, filed on May 25, 2001.

(51) Int. Cl.[7] .............................. G02B 6/12; G02B 6/36
(52) U.S. Cl. ............................ 385/14; 385/12; 385/37; 385/88; 385/89; 385/90
(58) Field of Search ..................... 398/87, 9; 385/12, 385/37, 14, 15, 24, 27, 88–90; 372/6

(56) References Cited

U.S. PATENT DOCUMENTS 5,042,898 A    8/1991  Morey et al.

6,281,997 B1 * 8/2001 Alexander et al. ............ 398/87
6,449,293 B1 * 9/2002 Pedersen et al. ............... 372/6

OTHER PUBLICATIONS

Ibsen, Morten, et al., "Dispersion–free fibre Bragg gratings," Proceedings of the Optical Fiber Conference, Mar. 2001, 6 pages.

* cited by examiner

*Primary Examiner*—Frank G. Font
*Assistant Examiner*—Michael P. Mooney
(74) *Attorney, Agent, or Firm*—Blakely, Sokoloff, Taylor & Zafman LLP

(57) ABSTRACT

A mounting platform provides support and packaging for one or more fiber Bragg gratings and electronic circuitry (e.g., heaters, coolers, piezoelectric strain providers, temperature and strain sensors, feedback circuitry, control loops), which may be printed on or on the mounting platform, embedded in the mounting platform, or may be an "off-board" chip solution (e.g., the electronic circuitry may be attached to the mounting platform, but not formed on or defined on the mounting platform). The fiber Bragg gratings are held in close proximity to the electronic circuitry, which applies local and global temperature and/or strain variations to the fiber Bragg gratings to, for example, stabilize and/or tune spectral properties of the fiber Bragg gratings so that spatial variations in the fiber Bragg gratings that result from processing and manufacturing fluctuations and tolerances can be compensated for.

16 Claims, 6 Drawing Sheets

APPARATUS AND METHODS FOR STABILIZATION AND CONTROL OF FIBER DEVICES AND FIBER DEVICES INCLUDING THE SAME

This application claims benefit of provisional application No. 60/293,681 filed May 25, 2001.

BACKGROUND

1. Field

Embodiments of the present invention relates to photonic devices and, more particularly, to stabilization and control of in-fiber photonic devices.

2. Background Information

An optical transmission system transmits information from one place to another by way of a carrier whose frequency is in the visible or near-infrared region of the electromagnetic spectrum. A carrier with such a high frequency is sometimes referred to as an optical signal, an optical carrier, or a lightwave signal.

An optical transmission system typically includes several optical fibers. Each optical fiber includes several channels. A channel is a specified frequency band of an electromagnetic signal, and is sometimes referred to as a wavelength. One link of an optical transmission system typically has a transmitter, the optical fiber, and a receiver. The transmitter converts an electrical signal into the optical signal and launches it into the optical fiber. The optical fiber transports the optical signal to the receiver. The receiver converts the optical signal back into an electrical signal.

An optical transmission system that transmits more than one channel over the same optical fiber is sometimes referred to as a multiple channel system. The purpose for using multiple channels in the same optical fiber is to take advantage of the unprecedented capacity offered by optical fibers. Essentially, each channel has its own wavelength, and all wavelengths are separated enough to prevent overlap.

One way to transmit multiple channels is through wavelength division multiplexing, whereupon several wavelengths are transmitted in the same optical fiber. Typically, several channels are interleaved by a multiplexer, launched into the optical fiber, and separated by a demultiplexer at a receiver. Along the way, channels may be added or dropped using an add/drop multiplexer or switched using optical cross-connect switches. Wavelength division demultiplexing elements separate the individual wavelengths using frequency-selective components, which can provide high reflectivity and high wavelength selectivity with the aim of increasing the transmission capacity of optical fibers.

Many of these frequency-selective components are in-fiber photonic devices in that the devices are part of an optical fiber. In-fiber devices have a large number of advantages. One advantage is that coupling of optical signals in and out of the optical fiber to another discrete photonic device (e.g., discrete filter) is avoided, which allows the optical transmission system to achieve much lower insertion losses and to increase long-term device reliability. An additional advantage is that polarization effects are reduced because cylindrical symmetry is maintained.

One of the limitations of in-fiber devices is that they are difficult to control using external inputs, to tune or to stabilize device properties, for example. For instance, one such in-fiber device is a fiber Bragg grating, which can be used as a temporally invariant optical filter. The physical properties (e.g., strain, temperature) of fiber Bragg gratings typically should be stabilized so that the filtering properties of the gratings are stabilized. When a fiber Bragg grating is attached to a substrate, however, the filtering properties of the fiber Bragg grating may be affected by the physical characteristics of the substrate.

Morey et al., U.S. Pat. No. 5,042,898 (hereinafter "Morey"), disclose temperature compensated embedded Bragg grating filters in which temperature-varying longitudinal strains are configured to compensate central wavelength changes attributable to temperature changes. Morey is limited, however, in that it does not compensate for other environmental conditions to which embedded Bragg grating filters may be subjected.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Embodiments of the present invention are directed to photonic devices. In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring understanding of this description.

Some parts of this description will be presented using terms such as in-fiber device, strain, photonic device, piezoelectric, laminate, and so forth. These terms are commonly employed by those skilled in the art to convey the substance of their work to others skilled in the art.

Various operations will be described as multiple discrete blocks performed in turn in a manner that is most helpful in understanding the invention. However, the order in which they are described should not be construed to imply that these operations are necessarily order dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
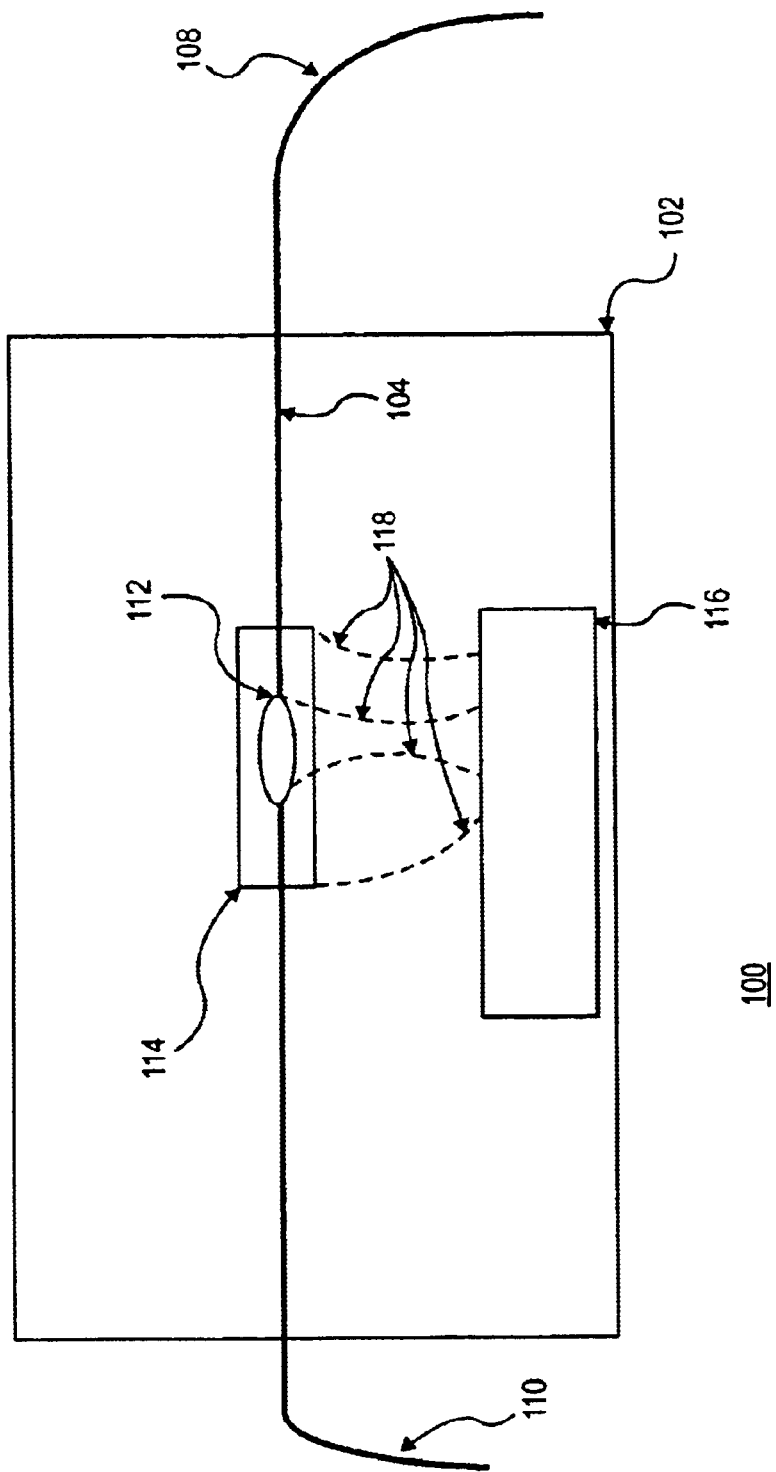
FIG. 1 is a schematic diagram of a photonic device according to an embodiment of the present invention.

FIG. 1 is a schematic diagram of a photonic device 100 according to an embodiment of the present invention. The photonic device 100 may be fiber-based hybrid photonic device in which one or more appropriate transducers are situated in proximity to a fiber Bragg grating. For example, the photonic device 100 may be an interferometric device based on combinations of splitters and fiber Bragg gratings (e.g., a filter assembly having a tunable dispersion compensator). Alternatively, the photonic device 100 may be a switch and/or a fiber-based variable optical attenuator. Of course, this list is not exhaustive and other photonic devices may be implemented as embodiments of the present invention.

The example photonic device 100 includes a substrate 102 and an in-fiber device 104 disposed in or on the substrate 102. The photonic device 100 also includes a pair of pigtails 108 and 110, a sensor 112, a transducer 114, a feedback circuit 116, and set of wires 118. In the embodiment shown in FIG. 1, the substrate 102 supports the in-fiber device 104, the sensor 112, the transducer 114, the feedback circuit 116, and the wires 118. Alternatively, the feedback circuit 116 may be "off-board" circuitry, such as a set of feedback electronics mounted upon a suitable substrate that is not substrate 102. Such "off-board" circuitry may comprise a single electronic chip or multiple electronic components. The sensor 112 may provide input to the feedback circuit 116, which may control the transducer 114. The wires 118 may couple communication between the feedback circuit 116 and the sensor 112. The wires 118 also may couple communication between the feedback circuit 116 and the transducer 114. The pigtails 108 and 110 may couple optical input and output to and from the photonic device 100.

Figure 3:
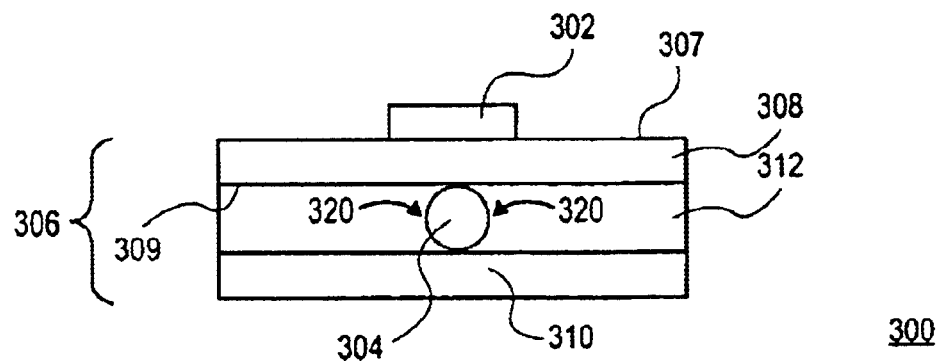
FIG. 3 is a perspective diagram (side view) of a photonic device according to an embodiment of the present invention in which the substrate is a laminated structure.
Figure 4:
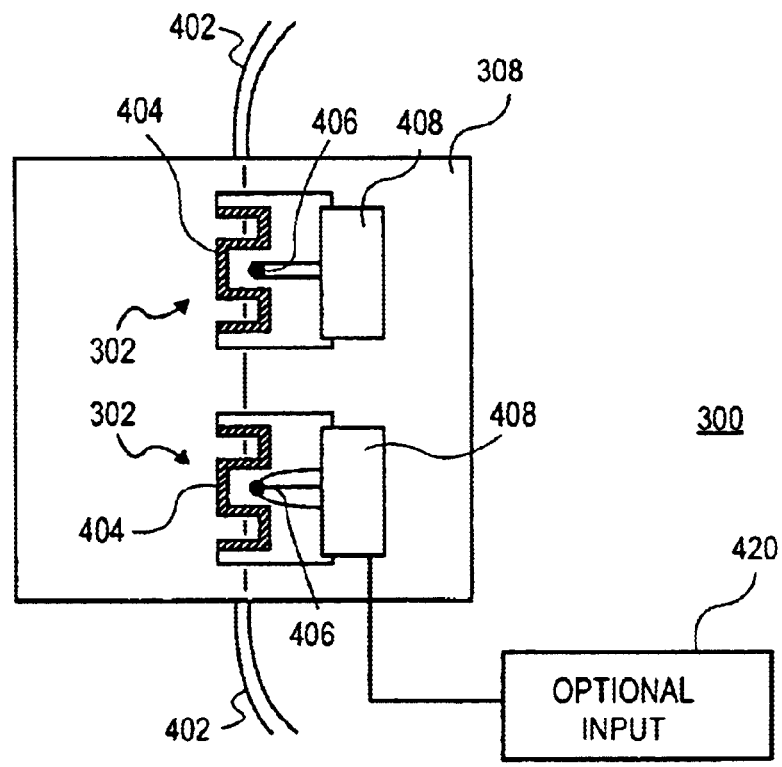
FIG. 4 is a perspective diagram (top view) of the example photonic device illustrated in FIG. 3.
Figure 5:
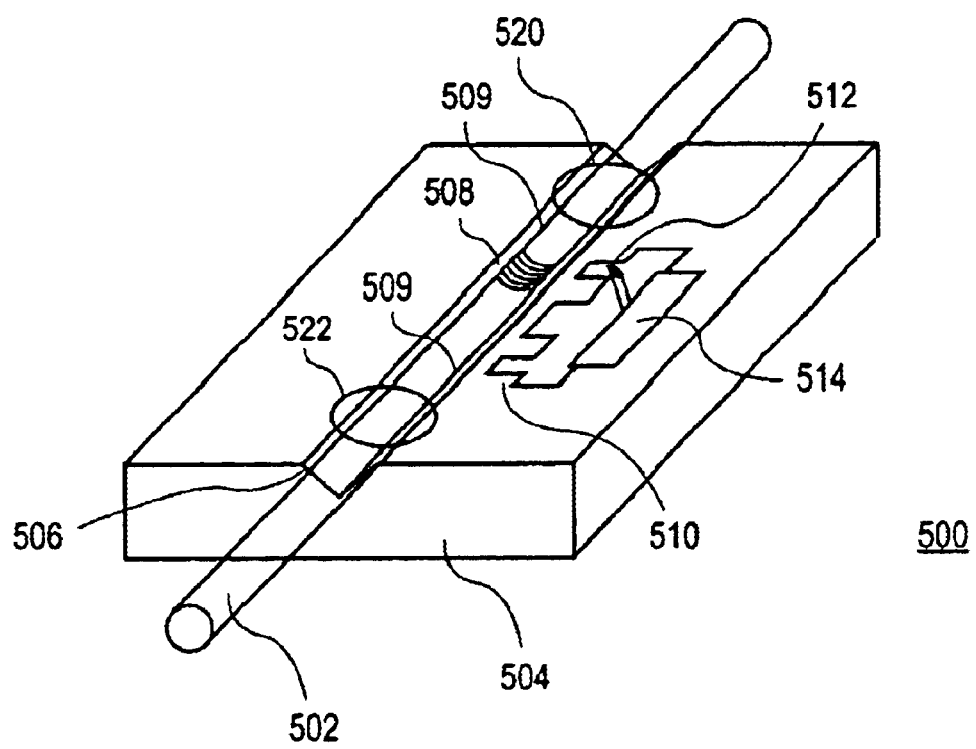
FIG. 5 is a perspective diagram (top view) of a photonic device according to an alternative embodiment of the present invention.
Figure 6:
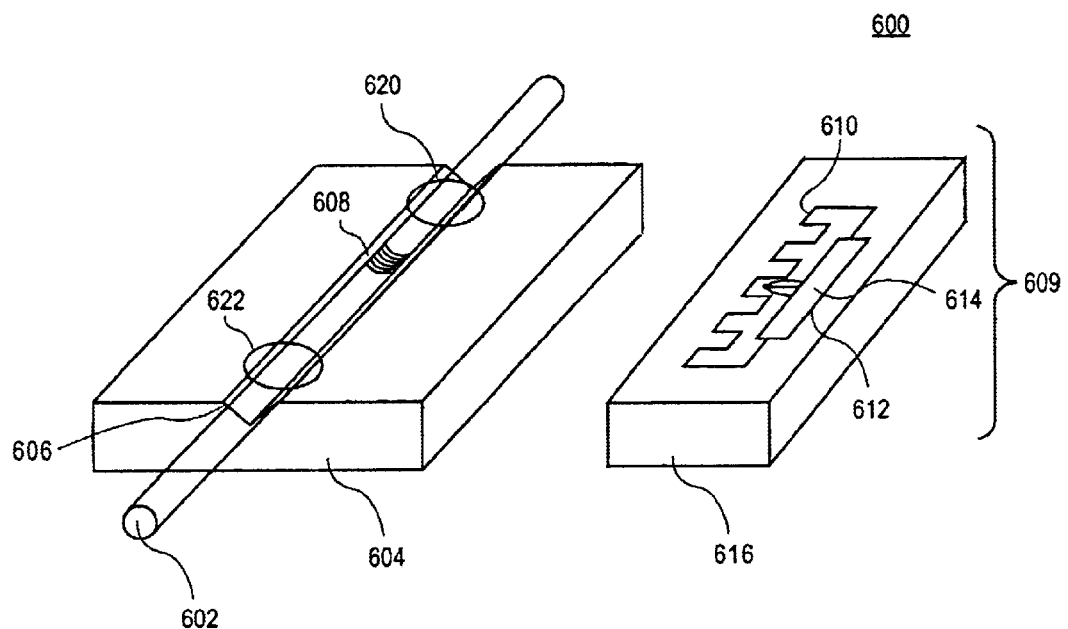
FIG. 6 is a perspective diagram (top view) of a photonic device according to an alternative embodiment of the present invention in which the substrate is a material that includes a V-groove.
Figure 7:
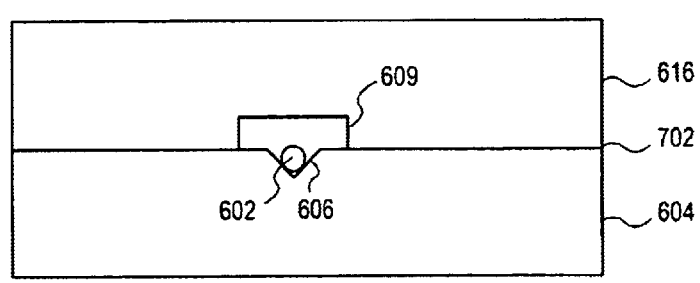
FIG. 7 is a perspective diagram (side view) of the example photonic device illustrated in FIG. 6.

According to embodiments of the present invention, the substrate 102 may be a laminated structure as described with respect to FIGS. 3 and 4, a material containing a v-groove as described with respect to FIG. 5, or a two-part composite structure that has a v-groove as described with respect to FIGS. 6 and 7. The substrate 102 may be a semiconductor substrate such as silicon. Of course other embodiments are possible for the substrate 102, such as a "flip-chip" platform. Alternatively, the substrate 102 may be a material suitable to function as a piezoelectric transducer.

The in-fiber device 104 may be a fiber Bragg grating. For ease of explanation embodiments of the present invention may be described with reference to the in-fiber device 104 being a fiber Bragg grating. Of course, other in-fiber devices may be implemented as embodiments of the present invention. Such devices might include optical splitters, optical couplers, optical switches, variable optical attenuators, optical interleavers, etc.

The pigtails 108 and 110 may be optical fibers. The sensor 112 may be a strain sensor, a thermocouple, or a thermistor, which sense strain and/or temperature. Of course, the sensor 112 may be another suitable sensor. The transducer 114 may be a heating element or a cooling element, which heat and/or cool the in-fiber device, substrate, or other component(s) of the photonic device 100. Suitable heating elements may be one or more off-the-shelf heaters, such as one or more NiChrome wires or other suitable heating elements. Suitable cooling elements may be one or more Peltier heater/coolers. Of course, the transducer 114 may be another suitable transducer, such as a piezoelectric transducer.

In one embodiment of the present invention, the fiber Bragg grating 104 has a particular spectral response. Placement of one or more transducers, sensors, and/or control loops (e.g., temperature sensors and heating/cooling elements) near the fiber Bragg grating facilitates closed-loop control of temperature and control of fiber Bragg grating spectral properties and permits spatially-varying temperatures and strains so that spatial variations in a fiber Bragg grating that result from processing and manufacturing fluctuations and tolerances can be compensated for.

Alternatively, such control permits micro-tuning of the shape and position of the fiber Bragg grating spectrum. In the representative examples discussed below, thermal control is used, although other forms of control, such as piezoelectric strain control can also be used. In addition, the mounting platforms and associated electronics and transducers are suitable for the mounting and control of other fiber-based devices and not just fiber Bragg gratings. Such devices include splitters, combiners, variable optical attenuators, optical switches, etc.

Figure 2:
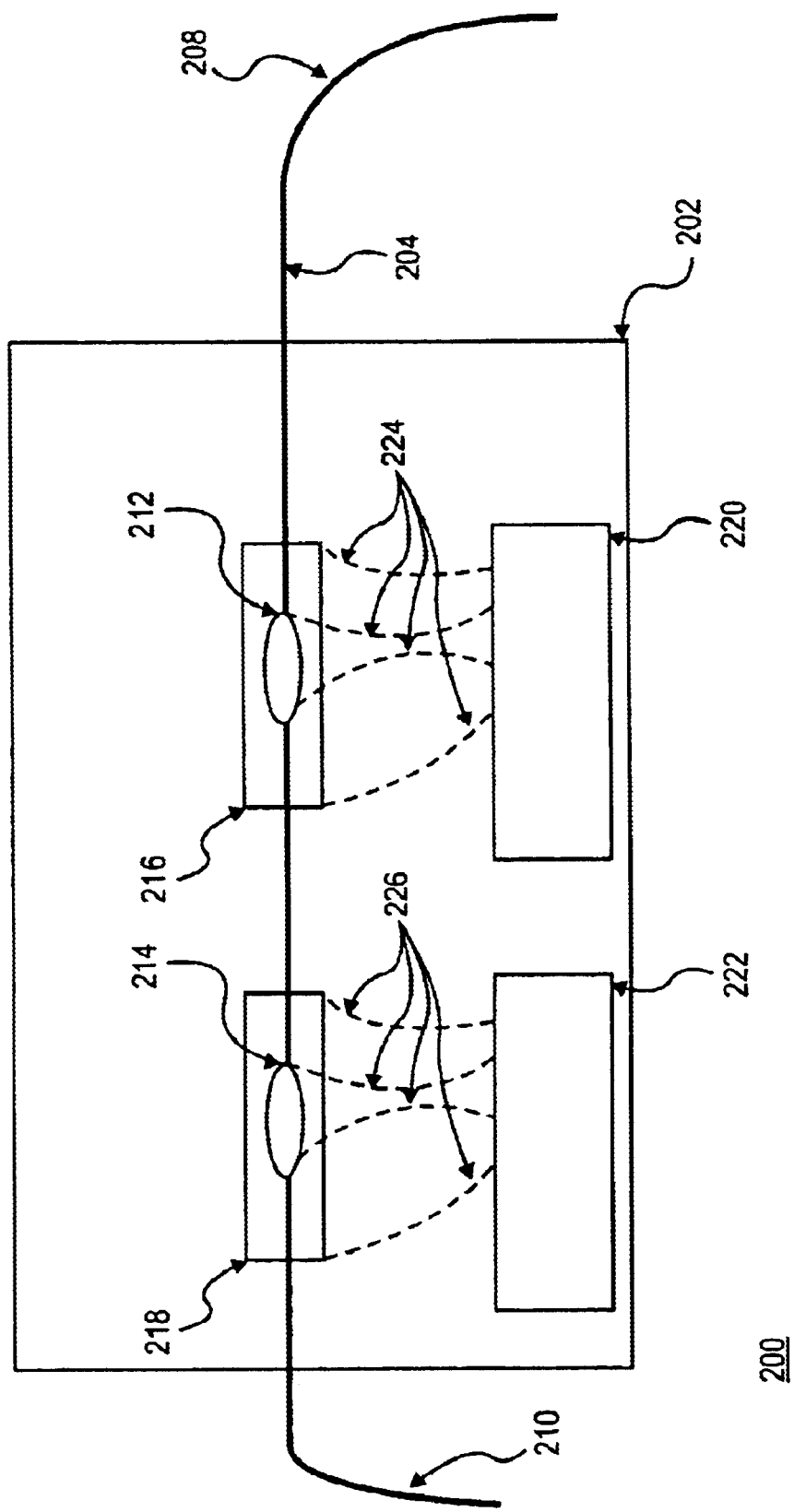
FIG. 2 is a schematic diagram of a photonic device according to an alternative embodiment of the present invention.

FIG. 2 is a schematic diagram of a photonic device 200 according to an alternative embodiment of the present invention. The photonic device 200 is similar to the photonic device 100 in that the photonic device 200 includes a substrate 202, which supports an in-fiber device 204 and includes and a pair of pigtails 208 and 210. The photonic device 200 also includes a pair of sensors 212 and 214, a pair of transducers 216 and 218, a pair of feedback circuits 220 and 222, and two sets of wires 224 and 226. The two sets of transducers, sensors, and feedback circuits may be used to separately control to different portions of in-fiber device 204.

Although only two sets of sensors 212 and 214, transducers 216 and 218, feedback circuits 220 and 222, and wires 224 and 226 are shown in FIG. 2, a person of ordinary skill in the relevant art(s) will readily recognize that other embodiments of the present invention may include more than two sets. Additionally, although individual feedback circuits are depicted for clarity, a person of ordinary skill in the relevant art(s) will readily recognize that a single feedback circuit may be used to control multiple transducer/sensor pairs. A person of ordinary skill in the relevant art(s) will readily recognize that the number of sensors does not have to equal the number of transducers.

In order to manufacture the example photonic device 100 or 200 according to embodiments of the present invention, the designer configures the characteristics of the various components to based on an intended fiber Bragg grating 104 or 204 spectrum according to a central wavelength (typically dependent on global changes in the fiber Bragg grating 104 or 204 environment), as well as the spectral shape of the filter function (typically dependent on local changes in the fiber Bragg grating 104 or 204 environment). Temperature and strain distributions can be selected to achieve an intended spectrum. For example, strains produce by changes in the size or shape of the device due to temperature fluctuations, humidity changes, aging, and electric field induced effects (piezoelectric), can be compensated for, or selected. Such effects can be compensated for or used to achieve an intended spectrum. For example, an enhanced tuning range can be achieved if a device is configured so that small changes in temperature produce large changes in strain and consequently large spectral shifts.

In the manufacture of the example photonic devices 100 or 200 according to embodiments of the present invention, manufacturing imperfections that might result in large temperature fluctuations along the length of the fiber Bragg grating 104 or 204 can be avoided. Such fluctuations can result from a distribution of thermal impedances between different heaters or heater regions and the fiber Bragg grating 104, and/or a distribution of thermal impedances between different temperature sensors and the fiber Bragg grating 104 or 204. A distribution of thermal impedances can also result form angular misalignment between the electronic elements (e.g., feedback circuitry, wires) and the fiber Bragg grating 104 or 204 or material variations such as thickness, density, grain structure, defects, etc. Additionally, spatial variations within electronic elements as well as piece-to-piece variations between the electronic elements, such as resistance, thermal transfer rates, thermal sensitivity, etc., can be calibrated.

The separation of the fiber Bragg gratings can be determined based on an intended temperature difference between fiber Bragg gratings and the thermal conductivity of the substrate. Manufacturing of multiple controlled fiber Bragg gratings in individual substrates could be improved by starting with a platform containing multiple fiber Bragg gratings and dicing into individual components.

In one embodiment of the present invention, a very uniform temperature may be provided (e.g., for use in filtering applications). This can be achieved by using a substrate with a high thermal conductivity. Alternatively, a large number of calibrated heater/temperature sensor pairs can be individually controlled to account for material and assembly fluctuations.

Note that the properties of all of the components of photonic devices implemented in accordance with embodiments of the present invention may be maintained consistent and controlled over and extended range of operational environments for the expected lifetime of the photonic devices. Therefore, the thermal expansion coefficients and the susceptibility to changes in humidity, electric field, magnetic field, or any other environmental variable may be maintained consistent over time and along the length of the fiber Bragg grating 104 or 204.

FIG. 3 is a side view of a photonic device 300 according to embodiments of the present invention in which the substrate is a laminated structure. The photonic device 300 includes control circuitry 302 (comprising, for example, one or more transducers, sensors, feedback circuitry) and an in-fiber device 304, which are mounted in/on a laminated mounting structure 306. The laminated mounting structure 306 includes an upper substrate 308, a lower substrate 310, and an adhesive layer 312. The upper substrate 308 includes an outer surface 307 and an inner surface 309. In one embodiment of the present invention, the in-fiber device 304 is attached to the laminated mounting structure 306, using an adhesive such as a two-part epoxy, an ultraviolet (UV) curable epoxy, solder, or other suitable attachment techniques, for example. According to alternative embodiments of the present invention, alignment marks 320 or other indicators may be provided on the laminated mounting structure 306 to aid in positioning the in-fiber device 304 with respect to the control circuitry 302.

In the embodiment of the present invention shown in FIG. 3, the laminated mounting structure 306 includes a single in-fiber device 304. However, in alternative embodiments of the present invention, the laminated mounting structure 306 includes more than one in-fiber device.

The upper substrate 308 may be fabricated from polymers, glasses, crystal, insulators, piezoelectric material, or other suitable material. The lower substrate 310 also may be fabricated from polymers, glasses, crystal, insulators, piezoelectric material, or other suitable material. The material of the lower substrate 310 need not be same material as the upper substrate 308.

The adhesive layer 312 holds upper substrate 308 and lower substrate 310 together. The adhesive layer 312 also holds the in-fiber device 304 in place. According to an embodiment of the present invention, the adhesive layer may be an elastomeric material or other suitable material.

The control circuitry 302 may be printed or mounted on the outer surface 307 of the upper substrate 308, may be formed in the inner surface 309 of the upper substrate 308 or may be embedded directly in the laminated mounting structure 306. Alternatively, the control circuitry 302 may be within the adhesive layer 303 or may incorporate an "off-board" chip solution (e.g., some portion of the control circuitry 302 may not be attached to the laminated mounting structure 306.

Strain distribution strains along the length of the fiber Bragg grating 304 can also be characterized and controlled according to embodiments of the present invention. Different regions of the fiber Bragg grating 304 are in physical contact with different regions of the adhesive layer 312. In one embodiment, reduction of strain differentials is promoted by having the adhesive 312 have properties that do not vary from point to point within the laminate mounting structure 306. Alternatively, if the adhesive 312 is elastomeric, it can serve to transfer the structural properties of the outer laminate materials of the substrates 308 and 310 to the fiber Bragg grating 304. In this case, the properties of the outer laminate materials of the substrates 308 and 310 may be consistent over a length scale comparable to the length of the fiber Bragg grating 304.

FIG. 4 is a top view of the photonic device 300 according to embodiments of the present invention showing the control circuitry 302 in more detail. Also shown in FIG. 4 are input and output pigtails 402. As illustrated in FIG. 4, the control circuitry 302 may include heating elements 404, temperature sensors 406, and feedback circuitry 408. In some embodiments, heating elements 404 could be replaced with strain transducers or other transducers known in the art. Similarly, temperature sensors 406 could be replaced with strain sensors or other sensors known in the art. Optional input 420 may be included to provide set point information for the feedback circuitry.

FIG. 5 is a perspective diagram (top view) of a photonic device 500 according to an alternative embodiment of the present invention in which a substrate 504 includes a V-groove 506. A fiber Bragg grating 502 is mounted on the substrate 504 inside the V-groove 506. The fiber Bragg grating 504 includes an active region 508 and inactive regions 509. The photonic device 500 also includes heaters 510, temperature sensing elements 512, and feedback circuits 514. The fiber Bragg grating 502 is mounted at two points 520 and 522, which are outside the active region 508. Bonding of the fiber Bragg grating 502 to the substrate 504 can be achieved by applying adhesive at the two points 520 and 522 such that the adhesive surrounds but does not contact the active region 508. The fiber Bragg grating 502 can be mounted with a controlled amount of "pre-strain" or no strain depending upon the application requirements.

The V-groove 506 serves to locate the fiber Bragg grating 502 with respect to the substrate 504 and may be a "v-groove" that is commonly used for locating a strand of optical fiber with respect to a substrate.

In the embodiment of the present invention illustrated in FIG. 5, the heaters 510, temperature sensing elements 512, and feedback circuits 514 are printed upon the substrate 504 in close proximity to the V-groove 506. Alternatively, if the substrate 504 is piezoelectric, the heaters 510 may be replaced with electrodes and the temperature sensing elements 512 may be replaced with strain sensors.

Note that the circuitry (e.g., the heaters 510, temperature sensing elements 512, and feedback circuits 514 in FIG. 5, or the electrodes and strain sensors in alternative embodiments) may be printed on the "top" surface of the substrate 504 next to the V-groove 506, on the "bottom" surface of the substrate 504 in substantial alignment with the groove 506, or within the V-groove 506.

Note further that the dimensional stability of substrate 504 may affect the spectrum of fiber Bragg grating 502 through strain variations. The dimensions of substrate 504 could be affected through changes in temperature, electric field, humidity, magnetic field, etc. In the embodiment in which the fiber Bragg grating 502 is mounted at points 520 and 522, the strain variations along the length of the fiber Bragg grating 502 may be very small, allowing strain to be considered as a global variable. Temperature variations along the length of the fiber Bragg grating 502 may be controlled as well.

FIG. 6 is a perspective diagram (top view) of an unassembled photonic device 600 according to an alternative embodiment of the present invention, in which a "flip-chip" platform is used and one substrate is used to hold an in-fiber device and a second substrate is used to hold control circuitry. For example, FIG. 6 shows a fiber Bragg grating 602 mounted on a substrate 604 inside a groove 606. The fiber Bragg grating 602 includes an active region 608. The fiber Bragg grating 602 is mounted at two points 620 and 622, which are outside the active region 608. Bonding of the fiber Bragg grating 602 to the substrate 604 can be achieved by applying adhesive at the two points 620 and 622 such that the adhesive surrounds but does not contact the active region 608. FIG. 6 also shows control circuitry 609, comprising one or more sensors 610, one or more transducers 612, and one or more feedback circuits 614, mounted, printed, or embedded on a substrate 616. According to the embodiment illustrated in FIG. 6, sensors 610 are temperature sensors and transducers 612 are heaters. Of course, one or more of the sensors 610 could be replaced with a different type of sensor and one or more of the heaters 612 could be replaced with a different type of heater in alternative embodiments.

The "flip-chip" design of the photonic device 600 allows for the separate optimization of the two substrates 604 and 616. For example, the substrate 616 can be optimized for the control circuitry 609 and the substrate 604 can be optimized for mounting and controlling the fiber Bragg grating 602, with attention being paid to thermal conductivity, thermal expansion coefficient, piezoelectric coefficients, sensitivity to moisture, bonding characteristics, etc. In an embodiment of the present invention, the substrate 616 may be silicon and the substrate 604 may be glass, which has properties very similarly to the optical fiber. Alternatively, the substrate 604 may be a more exotic material with a tailored thermal expansion coefficient to decrease (e.g., minimize) or possibly increase, (e.g., maximize) the temperature dependent spectral shift of the photonic device 600.

FIG. 7 is a perspective diagram (side view) of the photonic device 600 after the two substrates 604 and 616 are put together. For example, the photonic device 600 includes techniques 702 to hold the substrate 404 and the substrate 616 together. In one embodiment, the techniques 702 includes and adhesive layer and the substrates 604 and 616 are contacted and bonded such that the fiber Bragg grating 402 and the transducer circuitry (heaters 610) are substantially aligned. In other embodiments, other techniques, such as external compression or other suitable techniques are used to hold the substrates 604 and 616 together.

In one embodiment, the face of the substrate 604 is contacted to the face of the substrate 616 such that the fiber Bragg grating 602 is in very close proximity to the heating elements 610 and temperature sensing elements 612. In another embodiment, the groove 606 is designed such that top of the fiber Bragg grating 602 is flush with the top surface of the substrate 604, ensuring good contact with substrate 616 without introducing a large amount of transverse compression. In one embodiment, the adhesive used to bond the fiber Bragg grating to substrate 604 in regions 620 and 622 does not form a tall meniscus that would interfere with the contacting between substrates 604 and 616. Alternatively, small divots could be placed in the regions of substrate 616 that correspond to regions 620 and 622 to allow clearance for the adhesive. These divots could also be used as alignment aids in assembly of the photonic device 600.

In some embodiments of the present invention, uniform temperature and strain variations may be applied to a fiber Bragg grating using transducers, sensors, feedback circuitry, and/or other control circuitry to produce a shift of a central wavelength of filter embodying a fiber Bragg grating while leaving the shape of the filter unchanged. In other embodiments, non-position-dependent temperature and strain variations may be applied to a fiber Bragg grating.

In still other embodiments of the present invention, position-dependent temperature and strain variations may be applied to a fiber Bragg grating. Such variations can produce local changes in grating pitch and thereby lead to spectral distortion. In general, requirements on temperature and strain uniformity are functions of the spectral resolution and other spectral properties of the fiber Bragg grating. For example, a filter with a reflective bandwidth of 100 picometers (pm) and a temperature coefficient of 10pm/° C. should not be subjected to a temperature variation of more than about 0.1° C. to avoid significant spectral distortion. Similarly, the same filter with a strain coefficient of 1 pm/microstrain should not be subjected to a strain variation of more than about 1 microstrain to avoid significant spectral distortion. Note that the 1 pm deviation in central frequency along the length of the fiber grating is an order of magnitude estimate. In general, the size of the allowable deviation will depend in detail on the exact spatial profile of the grating, the effective spatial frequencies of the strain or temperature deviations, and the device tolerances.

In one embodiment of the present invention, more complex methods of control use temperature and/or strain variations along the length of the fiber Bragg grating to configure the spectral shape of the filter. Such variations can be used to control amplitude and phase characteristics of the spectral response. Such embodiments may be used a tunable dispersion compensators, which control of both the dispersion and the dispersion slope.

Control of spectral shape using temperature and/or strain variations may be considered based on two conditions. In a first condition, individual control elements and control loops are used to modify the characteristics of individual subsections of the fiber Bragg grating such that the overall spectral response, which is a combination of the spectral responses of each of the subsections, is controlled to achieve an intended spectral response. In a second condition, multiple overlapping control elements are controlled such that a superposition of the temperatures/strain variations produces intended spectral responses. Control elements may have associated temperature/strain gradients that "spill-over" into adjacent regions. For thermal control based on heating elements or cooling elements, spillover rates are a function of thermal conductivity and spillover can limit the spatial resolution with which temperature variations can be applied to the filter.

Figure 8:
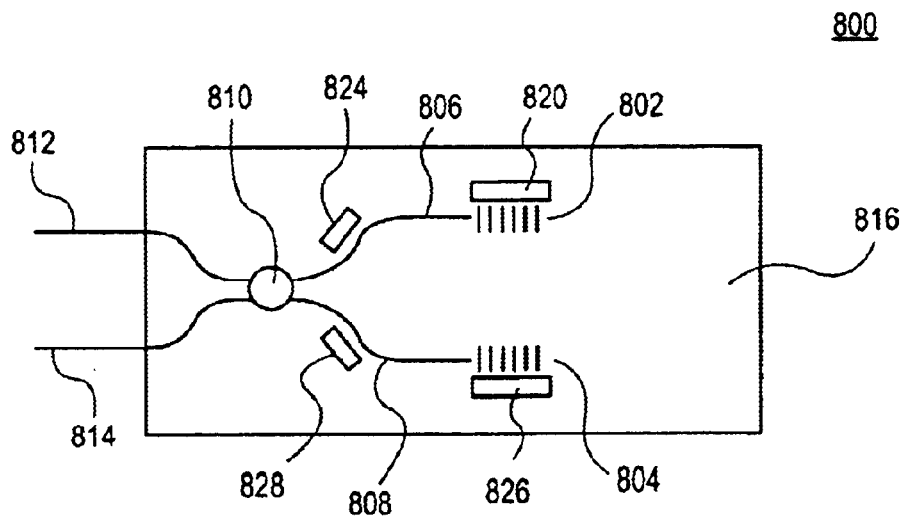
FIG. 8 is a perspective diagram (top view) of an optical system (a Michelson interferometer) according to an embodiment of the present invention.

FIG. 8 is a perspective diagram (top view) of an optical system 800 according to an embodiment of the present invention, in which two fiber Bragg gratings 802 and 804 are coupled through a splitter/coupler 810 to two ports 812 and 814 in a Michelson interferometer configuration and disposed (e.g., embedded) in or on a fiber control platform 816. Four control elements 820, 824, 826, and 828 also are embedded in the fiber control platform 816.

The splitter/coupler 810 may be any suitable fiber-based coupler and/or splitter, such as a fused fiber coupler. The ports 812 and 814 may be fiber pigtails.

The control elements 820, 824, 826, and 828 each may be one or more heating elements, one or more temperature sensors, and/or one or more electronic feedback circuits. The control elements 820, 826, and may control the spectral characteristics of each fiber Bragg grating 802 and 804, and the optical delay in each leg of the Michelson interferometer. Control of the optical path difference in the two legs of the Michelson interferometer is achieved through the control elements 824 and 828, which modify the length and/or index of refraction of fiber segments 806 and 808, respectively.

Note that only one of the control elements 824, 828 may be provided in many applications. However, because heaters are unipolar, having the ability to differentially heat both legs of the Michelson interferometer may enhance the resistance of the device to environmental fluctuations. When properly controlled, the accumulated phase difference for a given reflected color at splitter/coupler 810 causes the combined signal to exit through the output port 814. Mismatches from the ideal situation (in which both total optical paths are exactly matched) will lead to light leaking out through the input port 812.

In operation, light that enters the optical system 800 through the input port 812 that is resonant with fiber Bragg gratings 802 and 804 is output through the output port 814 and no light is reflected back through input port 812. Light that enters the photonic device 800 through input port 812 is split into two equal portions by the splitter/coupler 810. The light travels along fiber segments 806 and 808 and is filtered by the fiber Bragg gratings 802 and 804. The reflectivity spectra of fiber Bragg gratings 802 and 804 (amplitude and phase) are controlled by control elements 820 and 826, respectively. The reflected light travels along fiber segments 806 and 808 and is recombined at splitter/coupler 810.

Traditional use of fiber Bragg gratings in reflection geometry is achieved through the use of a circulator or a 3 dB splitter. The circulator is an expensive free space device with a typical insertion loss of 1.5–2 dB. 3 dB splitters can be manufactured cheaply as all-fiber components, but their use in this geometry introduces a 6 dB loss in the output port and also has a large reflection at the input port.

According to embodiments of the present invention, by using the fiber Bragg gratings 802 and 804 in a Michelson interferometer, it is possible to achieve low insertion loss and low back-reflection at the input port using an all fiber device. Also, mounting (e.g., embedding) the Michelson interferometer on the fiber control platform 816 allows for individual control of the components that make up the interferometer, which enables a higher performance photonic device.

In one embodiment of the present invention, the spectral response of the optical system 800 may be flat over the data bandwidth and over any required amount of spectral drift of the input signal that the optical system 800 may tolerate. In this embodiment, the amplitude and the phase of the reflected light may be held at a constant fixed relationship between the two arms of the interferometer over the operational bandwidth for the optical system 800. Therefore, the relative temporal delay between the two legs may be constant as a function of frequency, and the amplitude and group delay characteristics as a function of frequency of the two fiber Bragg gratings 802 and 804 may be matched. Mismatch of the two legs of the interferometer may lead to an increased insertion loss and an increased reflected intensity at the input port 812.

In an alternative embodiment, an ideal spectral filter for use in the optical system 800 may have a flat reflectivity spectrum and a constant group delay as a function of wavelength, i.e., a perfect mirror. In this embodiment, the two fiber Bragg gratings 802 and 804 may undergo spectral drift with respect to each other without affecting the output of the Michelson interferometer as long as the reflectivity spectra of the two fiber Bragg gratings 802 and 804 both included the spectrum of the input signal.

Most fiber Bragg gratings have flat spectral responses, but not flat group delay as a function of wavelength. In fact, most fiber Bragg gratings (such as those with standard Blackman apodization profiles) have a group delay that increases approximately quadratically with detuning from the center of the reflection band. For an interferometer utilizing this type of filter, spectral detuning of the filters (relative to each other) will cause delay differences as a function of wavelength, which swill cause a frequency dependent output and spectral shaping of the output signal. The control for this interferometer depends upon both the amplitude and phase of the spectral response of the fiber Bragg gratings.

In one embodiment, the sensitivity of the Michelson interferometer may be controlled (e.g., minimized) using fiber Bragg gratings with tailored group delay profiles, such as those described in University of Southampton (Proceedings of the Optical Fiber Conference 2001, Paper MC1). For example, the fiber Bragg gratings 802 and 804 may have group delay variations of a few picoseconds (relative to 10 s of picoseconds for a standard fiber Bragg grating such as a Blackman apodized fiber Bragg grating) across the passband, which can substantially improve the characteristics of the Michelson interferometer, including the insertion loss, return loss and spectral sensitivity.

Figure 9:
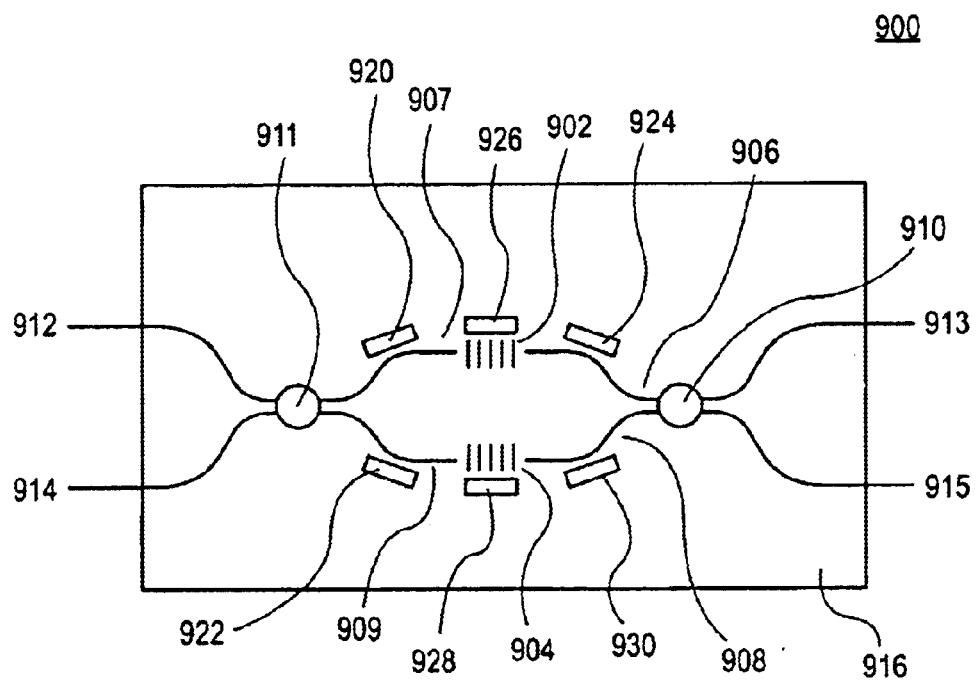
FIG. 9 is a perspective diagram (top view) of an optical system (a Mach-Zender interferometer) according to an alternative embodiment of the present invention.

FIG. 9 is a perspective diagram (top view) of an optical system 900 according to an embodiment of the present invention. In one embodiment, the optical system 900 is an optical add-drop multiplexer (OADM). Unlike prior art OADM devices that can include a pair of matched fiber Bragg gratings and two circulators and which can be relatively expensive and suffer from optical losses, an all-fiber OADM such as that embodied in the optical system 900 can include two fiber Bragg gratings configured in a Mach-Zehnder interferometer. By disposing (e.g., embedding) a fiber-Bragg grating-based Mach-Zehnder interferometer in or on a fiber control platform, the individual components of the Mach-Zehnder interferometer can be controlled such that the optical system 900 is stable, has low insertion loss, and offers high isolation.

The example optical system 900 includes two fiber Bragg gratings 902 and 904 in two fibers that have two fiber segments each (906 and 907, 908 and 909, respectively), which are coupled through two splifters/couplers 910 and 911 four ports 912, 913, 914, and 915 in a Mach-Zehnder interferometer configuration in or on a fiber control platform 916. Six control elements 920, 922, 924, 926, 928, and 930 also are mounted in or on the fiber control platform 916.

The splitters/couplers 910 and 911 may be any suitable fiber-based couplers and/or splitters, such as a fused fiber couplers. The ports 912, 913, 914, and 915 may be fiber pigtails. The control elements 920, 922, 924, 926, 928, and 930 may be each may be one or more heating elements, one or more temperature sensors, one or more electronic feedback circuits, and/or one or more other control elements. For ease of explanation, the port 912 is defined as the input port, the port 913 is defined as the output port, the port 914 is defined as the "drop" port, and the port 915 is defined as the "add" port for the OADM.

In operation, light that enters the optical system 900 at the input port 912 is split into two equal portions by the splitter/combiner 911 and travels along the fiber segments 907 and 909 to the fiber Bragg gratings 902 and 904. Light that is resonant with the fiber Bragg gratings 902 and 904 is reflected back along fiber segments 907 and 909 to the splitter/combiner 911 where it is recombined. If the relative delays along the interferometer arms match, then the reflected light will combine coherently and exit through the drop port 914, similar to the photonic device 800 described above. The control elements 920 and 922 may be used to control the delays induced by fiber segments 907 and 909 and the control elements 926 and 928 may be used to control the spectral responses of the fiber Bragg gratings 902 and 904. Thus wavelengths that are resonant with the fiber Bragg gratings 902 and 904 that are incident at input port 912 are dropped at the drop port 914.

Light that is not resonant with the fiber Bragg gratings 902 and 904 passes through the fiber segments 908 and 906 to be recombined at the splitter/combiner 910. The optical lengths of fiber segments 908 and 906 are controlled such that the light coherently recombines at output port 913. As this is a symmetric device, light that is resonant with the fiber Bragg gratings 902 and 904 that is incident at add port 915 will be output at output port 913, along with light that was incident at the input port 912 that passed through the device to output port 913.

The tolerances on the optical system 900 are similar to those of the photonic device 800 described above. Optical path mismatches, due either to mismatches between fiber segment pair 907 and 909, fiber segment pair 906 and 908, or the fiber Bragg gratings 902 and 904 may lead to a performance degradation, as evidenced by an increased insertion loss, and/or an increased cross talk between supposedly isolated ports, such as increased output at the drop port 914 for non-resonant signals incident at input port 912, increased output at the output port 913 for resonant signals incident at the input port 912, increased output of any type at the input port 912, increased output at the drop port 914 of resonant signals incident at the add port 915, etc. Use of fiber Bragg gratings with tailored group-delay profiles enhances the performance of the optical system 900.

Embodiments of the invention can be implemented using hardware, software, or a combination of hardware and software. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications and alterations are within the spirit and scope of the appended claims, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
  a flip-chip platform;
  at least one in-fiber device disposed in or on the flip-chip platform;
  at least one sensor operationally coupled to the in-fiber device;
  at least one transducer operationally coupled to the in-fiber device; and
  feedback circuitry operationally coupled to the sensor and the transducer.

2. The apparatus of claim 1, wherein the in-fiber device is a fiber Bragg grating.

3. The apparatus of claim 1, wherein the flip-chip platform includes groove, at least a portion of the in-fiber device being disposed in the groove.

4. The apparatus of claim 1, wherein at least one of the sensor or transducer is embedded in the flip-chip platform.

5. The apparatus of claim 1, wherein the flip-chip platform is fabricated from at least one of a polymer, glass, crystal, insulator, or piezoelectric material.

6. The apparatus of claim 5, wherein the flip-chip platform includes indicators to aid in aligning the in-fiber device and the electronic circuitry.

7. The apparatus of claim 3, wherein an active region of the in-fiber device is disposed in the groove and an inactive region of the in-fiber device is attached to the flip-chip platform using at least one of a two-part epoxy, an ultraviolet (UV) curable epoxy, or solder.

8. The apparatus of claim 3, wherein at least one of the sensor or transducer is in substantial alignment with the groove.

9. The apparatus of claim 1, wherein the flip-chip platform comprises a first flip-chip substrate, a second flip-chip substrate, and an adhesive between the first and second flip-chip substrates to hold the first flip-chip and second flip-chip substrates together.

10. The apparatus of claim 9, wherein at least one of the sensor or transducer is printed on the first flip-chip substrate.

11. The apparatus of claim 10, wherein a second flip-chip substrate includes alignment marks to align at least one of the sensor, transducer, or in-fiber device with each other.

12. A method of fabricating a photonic device, comprising:
disposing at least one in-fiber device in or on a flip-chip platform;
operationally coupling at least one sensor to the in-fiber device;
operationally coupling at least one transducer to the in-fiber device; and
operationally coupling feedback circuitry to the sensor and the transducer.

13. The method of claim 12, wherein disposing at least one in-fiber device in or on a flip-chip platform comprises disposing at least one fiber Bragg grating in or on a flip-chip platform.

14. The method of claim 12, wherein disposing at least one in-fiber device disposed in or on a flip-chip platform comprises disposing at least one in-fiber device in or on a grooved flip-chip platform.

15. The method of claim 13, wherein operationally coupling at least one sensor to the fiber Bragg grating comprises operationally coupling at least one strain sensor or at least one temperature sensor to the fiber Bragg grating.

16. The method of claim 13, wherein operationally coupling at least one transducer to the fiber Bragg grating comprises operationally coupling at least one of a heating element, cooling element, or a piezoelectric transducer to the fiber Bragg grating.

* * * * *